(12) United States Patent
Becker

(10) Patent No.: US 7,163,131 B2
(45) Date of Patent: Jan. 16, 2007

(54) BONDING OF A PLASTIC FIXTURE TO A GLASS CONTAINER

(75) Inventor: Roland Becker, Mainz (DE)

(73) Assignee: Schott AG, Mainz (DE)

( * ) Notice: Subject to any disclaimer, the term of this patent is extended or adjusted under 35 U.S.C. 154(b) by 378 days.

(21) Appl. No.: 10/376,714

(22) Filed: Feb. 28, 2003

(65) Prior Publication Data
US 2004/0011799 A1 Jan. 22, 2004

(30) Foreign Application Priority Data
Mar. 1, 2002 (DE) ............... 102 09 107

(51) Int. Cl.
B65D 25/42 (2006.01)
(52) U.S. Cl. .................................. 222/570
(58) Field of Classification Search ........ 222/567, 222/569, 570
See application file for complete search history.

(56) References Cited
U.S. PATENT DOCUMENTS 3,154,227 A   10/1964  Anderson et al. ........... 222/542
3,330,449 A    7/1967  Bloomfield et al. ........ 222/475
4,090,648 A *  5/1978  Roberts ...................... 222/570
4,838,463 A *  6/1989  Roberts ...................... 222/570
5,224,634 A *  7/1993  Graham ...................... 222/570

FOREIGN PATENT DOCUMENTS
DE    39 37 461    5/1991

* cited by examiner

Primary Examiner—Eric Keasel
(74) Attorney, Agent, or Firm—Baker & Daniels LLP

(57) ABSTRACT

Bonding (1) of a plastic fixture (2) to a glass container (3), comprising a glass container (3) with an opening area (8) bearing an opening (6) and a plastic fixture (2) with two walls (11, 12) enclosing both sides of the wall (20) of the glass container (3) in the opening area in circumferential direction, a first inner wall (11) and a second outer wall (12). The opening area (8) has an area of lesser external dimensions on the outer circumference than on the opening (6). A wraparound element (19) interrupted in circumferential direction which encloses the opening area (8) in the vicinity of lesser cross-section and supports itself on the wall (20) of the glass container (3). The plastic fixture (2) is positively connected with the wraparound element (19).

8 Claims, 5 Drawing Sheets

BONDING OF A PLASTIC FIXTURE TO A GLASS CONTAINER

BACKGROUND OF THE INVENTION

The invention relates to bonding of a plastic fixture on a glass container and further a procedure for achieving a permanent bond.

Bondings of a plastic fixture with a glass container are known in a number of designs for various applications. One essential field of application in which such compounds are subject to great demands is the field of glass containers for holding and transporting liquids with very high or fluctuating temperatures, such as coffee or teapots. The plastic fixture of such containers is designed as a pouring element or pouring brim, which surrounds the wall of the glass container in the opening area and is attached to the glass container. As a rule polypropylene is used as a material. The attachment occurs in accordance with a first design mechanically as a rule by means of frictional connection. On the basis of the differing materials of the elements coming into contact with one another—glass container and plastic fixture—and their differing thermal expansion coefficients, this type of attachment frequently results in glass breakage. To solve this problem, the mechanical coupling has been dispensed with and an integral joint between glass container and plastic fixture by means of adhesion has been resorted to. The problematic nature of these bonds however lies in the poor bonding properties of polypropylene, which can be improved by means of a time-consuming and expensive pretreatment of the plastic, but which nevertheless only supplies unsatisfactory results with regard to the strength of the bond under common temperatures of the filling fluids for the glass container of >70° C. and thus represents a safety risk.

Therefore, the object of the invention is based on creating a permanently secure bond of a plastic fixture to a glass container, which is independent from the application and the selected materials for the plastic fixture. The solution should be distinguished by a low production and assembly cost and should be economical. Expensive pretreatments of the plastic are to be avoided.

SUMMARY OF THE INVENTION

The bond of a plastic fixture on a glass container in accordance with one form of the invention is characterized by a positive bond between the plastic fixture and a slotted wraparound element which encloses the exterior of the glass container in the opening area in an area of lesser cross-section than at the opening. By opening area, that area is understood in connection with the opening, which is constructed tapered across from the remaining glass container with regard to the cross-sectional area. The wraparound element is dimensioned with regard to its geometry and dimensions in such a way that its inner circumference has greater dimensions than the outer circumference in the area of lower cross-section of the opening area, but lesser dimensions than the following area of the opening area up to the opening. Arranged at the outer circumference of the wraparound element, there is, proceeding in a circumferential direction, preferably a rotary recess or number of recesses proceeding in a circumferential direction at specific intervals to each other. According to the invention these recesses interact in a form-locking manner with complementary constructed projections at the inner circumference of the plastic fixture, in particular in the form of a snap connection.

For this purpose the plastic fixture has two walls which enclose both sides of the wall of the glass container in fitting position in the opening area in circumferential direction, which can also be referred to as lips and are an integral component of the plastic fixture. These lips are arranged at the inside circumference and constructed directed toward the glass container. The first inner wall is arranged in fitting position in the opening, the second outer wall encloses the wall of the glass container in the opening area from the outside. The attachment of the plastic fixture thus occurs indirectly, i.e. not directly at the walls of the glass container, but rather by means of the wraparound element, which in turn abuts the outer wall of the glass container at least with a part of its interior surface. The projection or projections at the inner circumference of the plastic fixture are arranged at the interior surface pointing to the glass container wall at the second outer wall. This type of bond prevents the differing thermal expansions due to the differing physical properties of glass and plastic resulting in the breakage of the glass container in the carrying and transportation of filling fluids at high temperatures, for example above 70° C., by means of the no longer existing direct contact between glass container and plastic fixture.

The selection of the material and the geometric dimensioning of the wraparound element are selected in such a way that a simple assembly can occur by means of putting the wraparound element over the wall of the glass container in the opening area by means of slight bending up of the wraparound element.

The cross-section of the opening area and/or the opening can be constructed in diverse designs. Circular, oval or any cross-sections at all are conceivable.

Preferably, however, the wall of the glass container will have a circular or oval cross-section in the opening area to avoid unnecessary stresses due to molding. In accordance with an especially advantageous design the entire glass container is constructed circular in cross-section. The wraparound element is with regard to its shape adapted to the shape of the opening area and has a slot in circumferential direction. With a circular design the wraparound element is annular and for assembly reasons has a slot, i.e. the ring is interrupted in circumferential direction.

For production reasons, the recess on the wraparound element proceeds preferably around the entire circumference and is designed as a groove, which is aligned in fitting position of the wraparound element essentially horizontally and/or at an angle, however preferably at a right angle to the guide direction of the plastic fixture in the generation of the bond with the glass container.

To simplify the assembly, at the plastic fixture, in particular at the second outer wall, preferably at least three projections are provided arranged adjacent to one another in circumferential direction, which interlock into a rotary groove on the wraparound element. For uniform load distribution the projections are arranged at equal intervals in circumferential direction. A design with a small number of recesses arranged adjacently to one another in circumferential direction on the wraparound element and projections on the second outer wall can be used to fix the position of the two to each other in circumferential direction.

The rotary projection or projections are designed in one piece with the wall of the plastic fixture, i.e. are molded on to it.

Theoretically it would also be possible to exchange the carriers of recess and/or groove and projection, i.e. provide the groove at the plastic fixture, in particular the second wall and the projections on the wraparound element. However, in practice this solution is only of slight significance, since the production cost is greater and the second wall would have to be designed with an unnecessarily strong thickness.

The first inner wall is with regard to the selected material and/or its geometric dimensions, in particular with regard to the ratio of height and thickness preferably formed in such a way that in assembled condition in the end area pointing to the glass container interior it comes to rest elastically at the inner wall of the glass container in the opening area. Depending on the greatness of the force by means of which the wall is pressed against the inner wall, a sealing effect between the glass container interior and the surroundings can be achieved in both directions.

In accordance with an advantageous further development, however, a rotary seal is provided between a wall of a lip pointing to the wall of the container and the wall of the container. This sealed contact joint serves to seal the glass container interior opposite the environment above the gap between the wall of the glass container, the walls enclosing the wall of the glass container in the opening area—first wall and second wall—and the annular element and vice versa.

The arrangement of the seal can occur
a) between the outer circumference of the glass container wall and outer wall on the plastic fixture in fitting position between the inner circumference of the plastic fixture and the areas on the wraparound element pointing to it, i.e. above the wraparound element or
b) between the inner circumference of the glass container in the opening area and the first inner wall For assembly reasons preferably variant b) is selected.

The rotary seal can be designed as a separate element or as an integral component with the plastic fixture. Preferably a one piece design is selected, preferably in the form of molded-on sealing lips. The molding to the first inner wall with elastic design of the same is especially advantageous, since by means of this measure an optimum resting of the sealing surfaces—sealing lip and inner circumference of the glass container in the opening area—on each other is achieved.

However, according to an advantageous embodiment the gap between the wall of the glass container, the walls of the plastic fixture enclosing the wall of the glass container in the opening area and the annular element are filled with a filling fluid. This serves for additional stabilization of the position of the plastic fixture opposite the wall of the glass container, the sealing of the gap opposite the interior of the glass container and the increasing of the strength of the bond. Preferably a substance with good adhesive properties is used to increase the strength of the bond as a filling fluid, for example an adhesive or silicon. In the use adhesives of there are no special requirements with regard to the location of the individual elements—wall of the glass container in the opening area and the first inner wall and second outer wall of the plastic fixture—to be made, since gaps can be completely filled in by adhesive and they can come into contact with the filling fluid on the basis of the required suitability for foodstuffs. Depending on the desired strength and/or density it is therefore recommended to use a one or a two-component silicon adhesive (silicon adhesive because of the different expansion coefficients of the material components) in combination with a plastic that bonds well (ABS, PC or similar). If neither the strength nor the density is of great importance, for example a PP or low-grade plastic can be used as a material or a filler or a rubber gasket can be used for the density. In the simplest case the plastic fixture consists of the first inner wall, the second outer wall and the connector between the two. However, additional modifications are also conceivable, for example the embodiment on the outer circumference with functional elements such as spouts, handles etc. and/or additionally further walls for aesthetic design—for example the accommodation to the surface of the glass container.

The solution in accordance with the invention, in particular with additional incorporated material offers the advantage of creating a permanent and also loadable bond, which can only be dissolved by destroying the individual components. The solution in accordance with the invention is generally suitable for bondings of any plastic fixture on a glass container. Use in a coffeepot or teapot or glasses for boiling water is especially advantageous.

BRIEF DESCRIPTION OF THE DRAWINGS

The solution in accordance with the invention is described in the following using figures. In particular, the following is presented.

DETAILED DESCRIPTION

Figure 1:
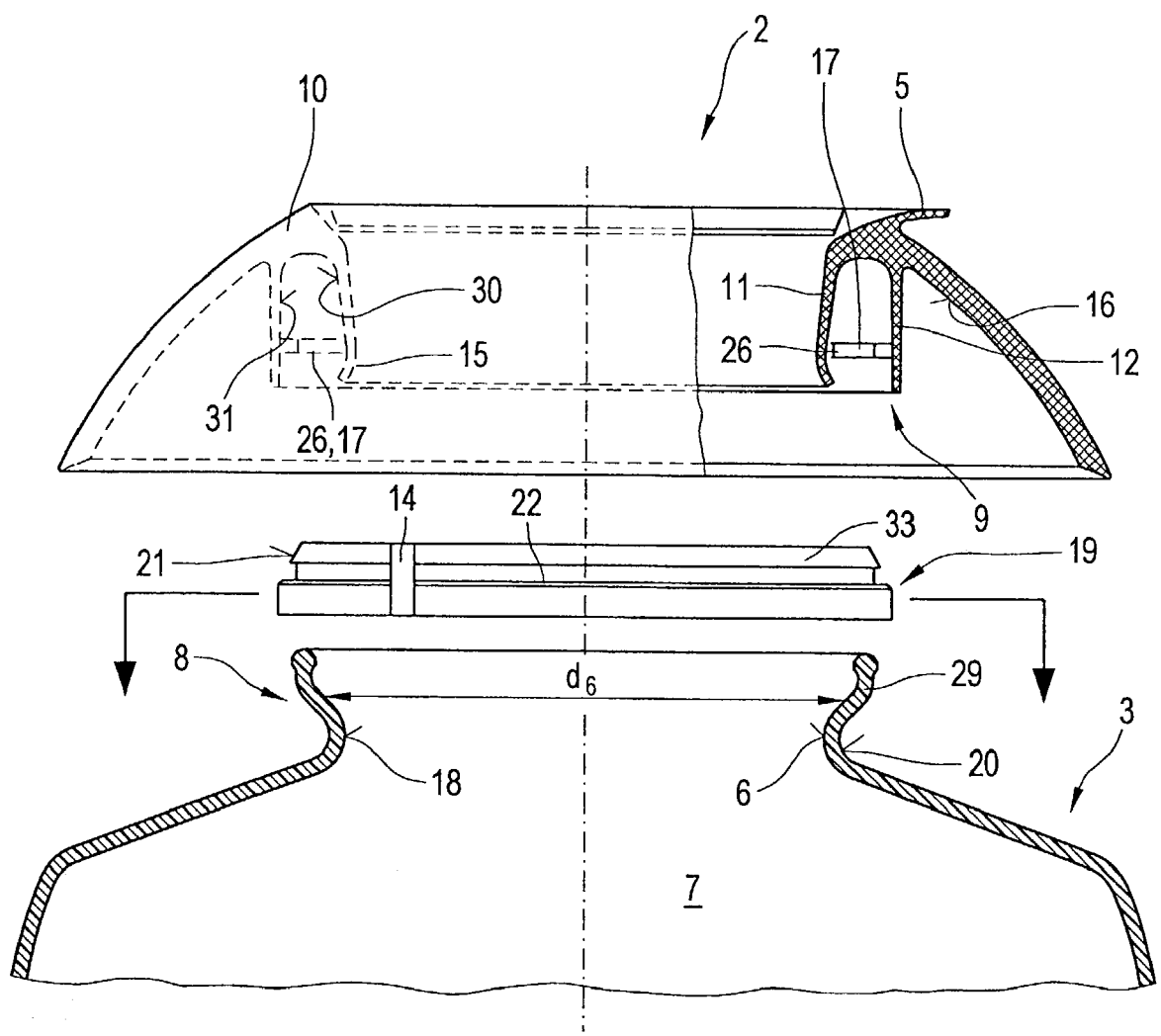
FIG. 1 illustrates in schematically simplified presentation the basic structure of the individual elements of the bond.

FIG. 1 illustrates in schematically greatly simplified presentation using lateral views and in part axial sections the basic structure of the individual elements for achieving a permanent bond 1 of a plastic fixture 2 on a glass container 3 in a view of the situation prior to assembly. If the glass container 3 is a coffeepot or teapot, the plastic fixture 2 is constructed in the shape of a pouring ring or pouring brim 5. In accordance with the purpose of the glass container 3 the plastic fixture 2 can also assume other forms.

The glass container 3 has an opening 6 for receiving and dispensing of filling fluid in and/or out of the interior 7 of the glass container 3. The glass container 3 is constructed in the vicinity of the opening with a lesser diameter $d_6$ compared to the remaining interior 7. The area in which the opening 6 is arranged functions as a receiving and/or dispensing area is referred to as the opening area 8. This extends in functional location of the glass container 3 as a rule in vertical direction. Other directions are also conceivable. The fixing of the plastic fixture 2, for example in the shape of a pouring ring or pouring brim 5 occurs in the opening area 8. The pouring ring or pouring brim is made of plastic and encloses the wall 29 of the glass container 3 in the opening area 8 in circumferential direction on both sides. The plastic fixture 2 can be designed differently with regard to geometry. However, said plastic fixture has preferably an inner wall geometry in the circumferential area, which makes possible an enclosing of the opening area 8. For this purpose, viewed in the fitting position there are two hollow cylindrical walls 11 and 12 provided which extend to the glass container 3, which can also be referred to as lips under correspondingly lower thickness, whereby these are molded onto the plastic fixture 2. The first hollow cylindrical wall 11 extending to the glass container is characterized by greater dimensions characterizing its outer circumference 30 than the inner circumference 18 of the glass container 3 in the opening area 8. The second wall 12 extending to the glass container encloses the glass container 3 at the outer circumference 20 in the opening area 8. Both walls are connected with each other in vertical direction in the upper area 10 by means of the inner circumference 16 and define an intermediate space 13. Further, the plastic fixture 2 has a device for position fixing and attachment 9 for fixing in vertical direction. This device includes at least one rotary projection 26 designed in one piece with the plastic fixture 2 or a number of individual projections arranged adjacent to one another, which can also be referred to as segments 17, and which are arranged on the inner circumference 31 of the second wall extending in vertical direction to the glass container 3 and which extend toward wall 29 of glass container 3 in fitting position. Further, the device 9 includes a wraparound element 19 which encloses the glass container 3 in the opening area 8 in an area of lesser external dimensions 32 than at the opening 6 in fitting position. The wraparound element 19 is slotted for this purpose, i.e. provided with an interruption 14 in the direction of circumference, to place the wraparound element 19 in the fitting position, i.e. to lift it above the opening area 8. The inner dimensions of the wraparound element 19 are selected in such a way that they cannot be moved in fitting position without expanding the wraparound element 19 above the opening area 8 of the glass container. Preferably the glass container 3 and the opening area 8 are designed in circular cross-section. The wraparound element 19 is then designed as an annular element 33. The wraparound element has a groove 22 arranged on the outer circumference 21, preferably extending in circumferential direction over the entire circumference for the purpose of achieving a form closure with the projections 26 designed as rotary segment 17 or a number of segments 17.

The first wall 11 is selected with regard to its geometric design and dimensioning in such a way that viewed in fitting position it is touching at least a part of the inner circumference 18 in the opening area 18 of the opening 6.

Figure 2A:
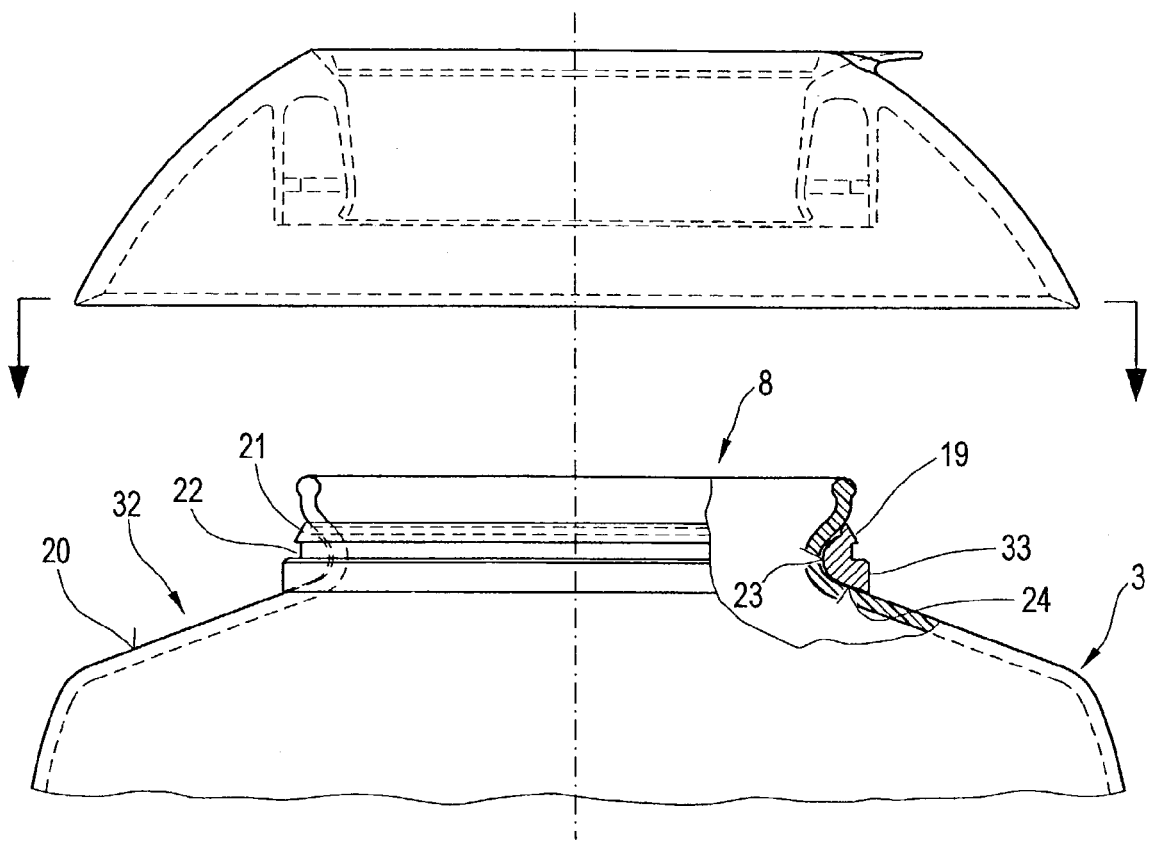
FIGS. 2*a* and 2*b* show in a view in accordance with FIG. 1 the state in fitting position after the individual assembly steps.
Figure 2B:
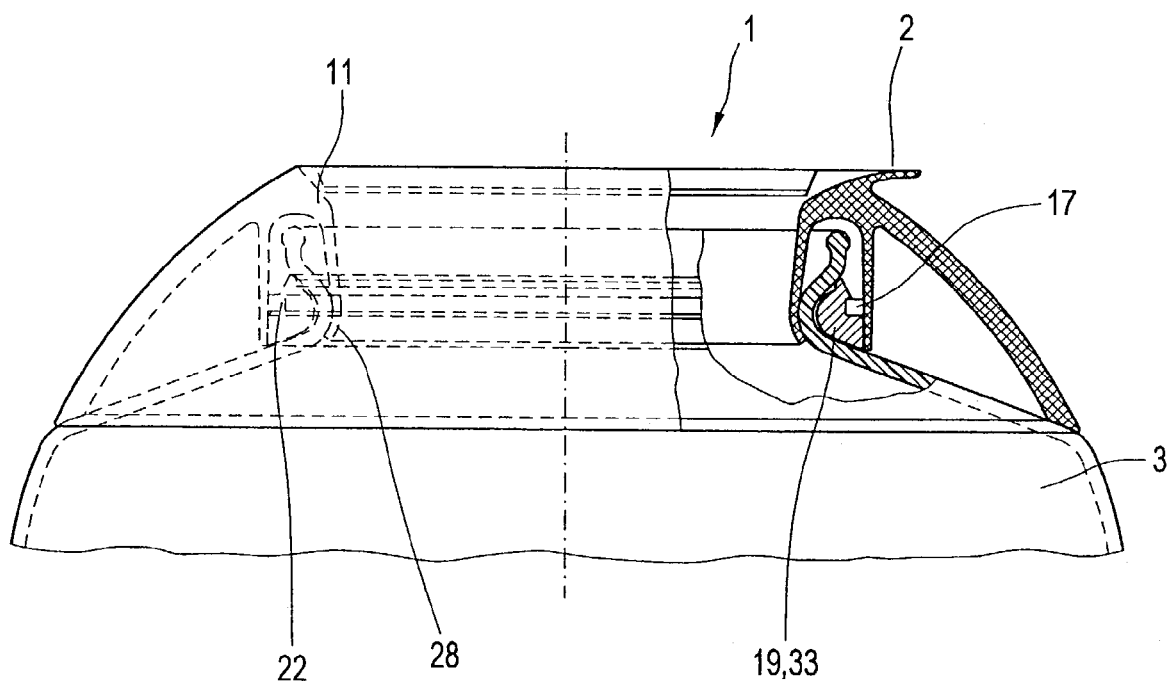

FIGS. 2a and 2b, in schematically simplified display using axial sections, illustrate the individual procedure steps in assembling the bond 1 between a plastic fixture 2 and the glass container 3.

FIG. 2a illustrates the loading of the wraparound element 19, in particular of the annular element 33 to the glass container 3 in the vicinity of the lesser external dimensions 32 of the opening area 8 in completed state. It can be recognized that the annular element 33 bearing the groove 22 is designed with regard to its geometry at the inner circumference 23 in such a way that the inner circumference is resting on the outer circumference 20 of the glass container 3 with at least a part of the area 24 formed by the inner circumference 23. The annular slotted element 33 is preferably also made out of plastic.

Figure 3A:
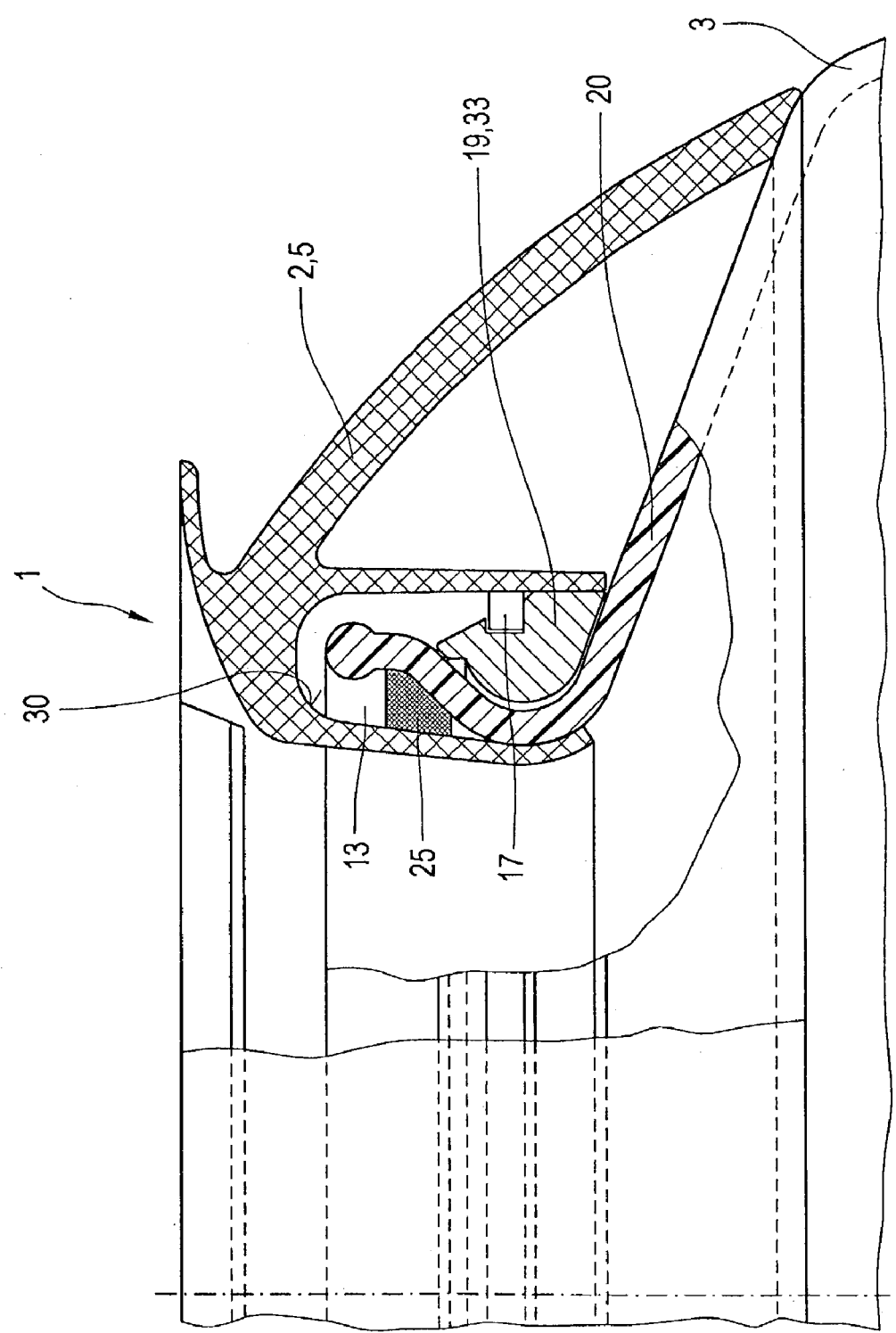
FIGS. 3*a* and 3*b* illustrate the bond 1 in accordance with the invention with additional sealing measures.

FIG. 2b, in schematically simplified display using an axial section, illustrates the state of the bond 1 between the plastic fixture 2 and the glass container 3 after loading the plastic fixture 2 on the glass container 3. This shows clearly that the segment 17 snaps into the groove 22 in the annular element 33 and thus is positively coupled with it. The annular element 33 forms on the basis of its inner geometry construction a type of barb across from the part of the opening area 8, which is characterized by greater external dimensions than area 32. The plastic fixture 2 thus supports itself indirectly by means of the wraparound element 19 on the glass container 3. This bond 1 thus prevents a loosening of the bond in vertical direction. This is only possible with a corresponding expenditure of force. To prevent an overflow of the filling fluid from the interior 7 of the glass container 3 over the bond 1 to the surroundings the first wall 11 is designed in such a way that it is resting on the inner circumference 18 in the opening area 8 of the glass container 3. This area is marked with 28. The wall 11 has for this purpose elastic properties, which are produced by the material selection and/or the dimensioning of the wall 11. In the displayed construction the contact area 28 is formed by the end area 15 of the first wall 11 and the inner circumference 18 in the opening area 8 of the glass container 3. The wall of the plastic fixture 2 rests moreover on the glass container 3. Since to achieve a sealing effect between the plastic fixture 2 and the glass container 3 either corresponding fits between the individual elements to be bonded to each other would have to be provided, which in turn in a filled state of the glass container at correspondingly high temperatures of the filling fluid would lead to stresses in the individual elements, which in turn can result in irreparable damages the individual fits are selected in such a way that these negative effects are avoided even in loaded state upon occurrence of such stresses. For this reason it is necessary to provide a seal between the glass container 3 and the plastic fixture 2. The sealing effect is achieved for example by means of a separate rotary seal, in accordance with FIG. 3a, which is marked with 25 and is arranged as a sealed contact joint between the inner circumference 18 of the glass container in the opening area 8 and the outer circumference 26 of the wall 11. The sealed contact joint can be constructed as a lip seal. Other possibilities are also conceivable. By means of this an overflow of filling fluid from the inner circumference 7 over the bond 1, particularly the gap 13 between the two walls 11 and 12 to the surroundings is prevented.

Figure 3B:
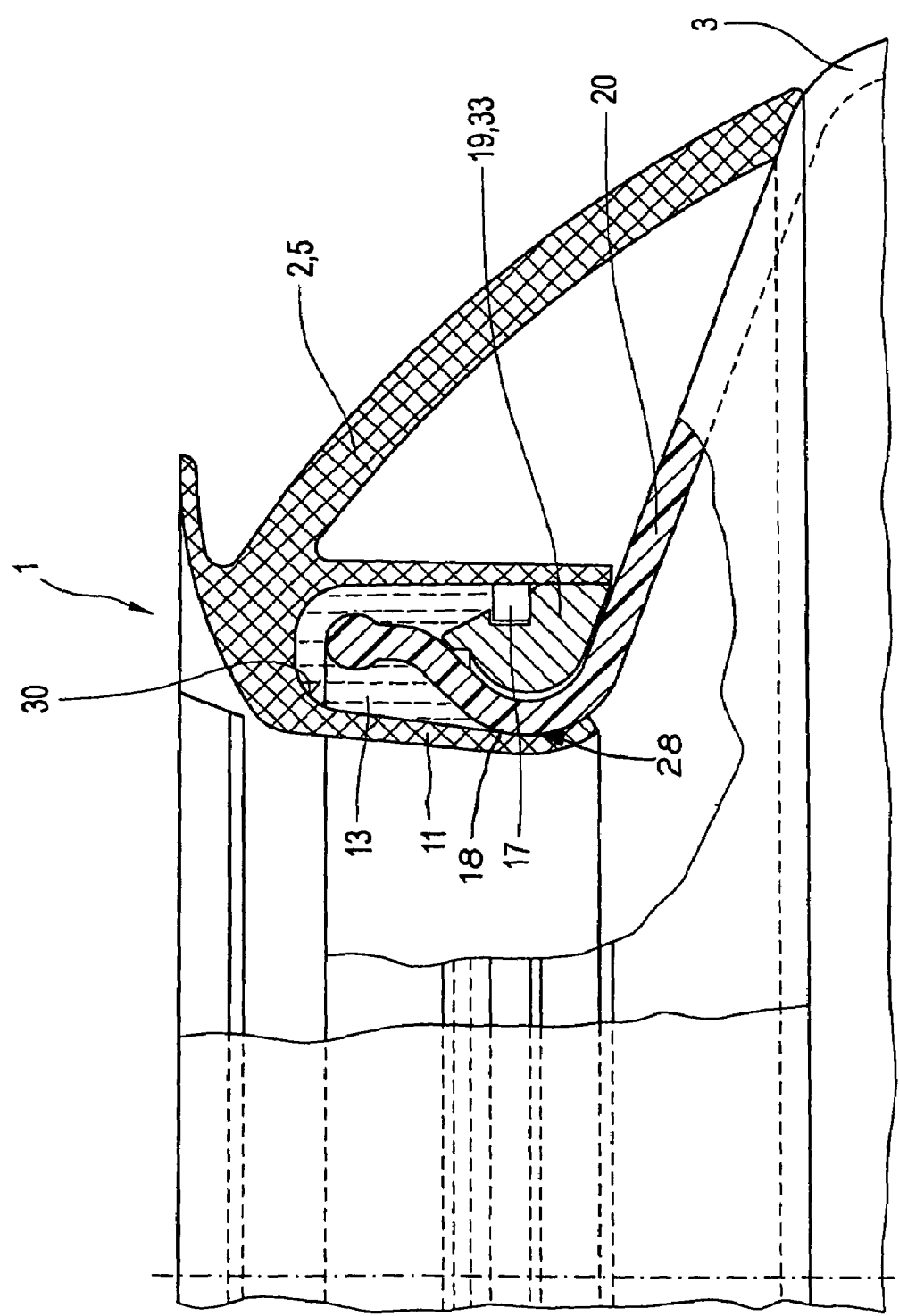

FIG. 3b illustrates a second design possibility for achieving the seal between the plastic fixture 2 and the glass container 3. In this case the gap 13 in fitting position of annular element 19 and the plastic fixture 2 between the wall of the glass container 3 in the opening area 8 and the plastic fixture 2 is filled with a cured thermoset filler or an adhesive. In the process it is important that the gap 13 is limited by the contact area 28 between the outer circumference 30 of the first wall 11 and the inner circumference 18 in the opening area 8. This prevents the filler or adhesive from coming directly into contact with the interior 7 or the fluid located in the interior 7.

The solution according to the invention makes it possible to create a permanent bond 1 between a plastic fixture 2 and a glass container 3. This solution is characterized by the fact that it is achieved on the basis of a combined positive, and upon support of the wraparound element on the glass container 3, in particular of the wall 20, frictional connection or a combined positive and integral connection is achieved. This bond is suitable for filling fluids of the glass container with very high temperatures without having to fear a glass break in the vicinity of the bond with the plastic fixture on the basis of the resulting thermal expansions of the materials. However, the bond can only be severed by means of its destruction.

REFERENCE SYMBOL LIST

1 Bond of a plastic fixture on a glass container
2 Plastic fixture
3 Glass container
4 Coffeepot
5 Pouring ring or pouring brim
6 Opening of the glass container
7 Interior of the glass container
8 Opening area
9 Device for position fixing and attachment
10 vertical upper area 11 hollow cylindrical wall extending in vertical direction to the glass container
12 second hollow cylindrical wall extending in vertical direction to the glass container
13 interior
14 interruption
15 end area
16 inner circumference of the plastic fixture
17 segment
18 inner circumference of the glass container
19 wraparound element
20 outer circumference of the glass container in opening area 8
21 outer circumference of the annular element 19
22 groove
23 inner circumference of the annular element 19
24 area
25 seal
26 projection
28 contact area
29 wall
30 outer circumference first wall
31 inner circumference second wall
32 area of lesser external dimensions
33 annular element
$d_6$ Opening diameter of annular element 19
$s_{12}$ thickness of wall 12
$s_{11}$ thickness of wall 11

The invention claimed is:

1. A container assembly, comprising:
    a glass container having an opening region defining an opening, the opening region including a wall with a reduced outer diameter portion;
    a wraparound element having a radial slot therethrough and being disposed around and supported on the reduced diameter portion of the container wall;
    an annular plastic fixture being positively connected to the wraparound element and the opening region of the glass container, said fixture including spaced-apart first inner and second outer walls peripherally enclosing two sides of said glass container wall in the opening region, said spaced apart walls defining an intermediate space wherein a contact area between the outer circumference of the first inner wall and the inner circumference of the opening is formed, and
    a cured filler medium that substantially fills the remaining of the intermediate space not occupied by the glass container wall and the wraparound element, said filler being adhered to said fixture walls, glass container wall and wraparound element.

2. The container assembly of claim 1, wherein the positive connection between the wraparound element and plastic fixture is produced by mutually complementary recesses and projections on the wraparound element and on an inner periphery of the second outer wall of the plastic fixture.

3. The container assembly of claim 2, wherein the wraparound element on its outer periphery has a groove running in the peripheral direction and extending around the periphery.

4. The container assembly of claim 3, and including, at the inner periphery of the second wall, a projection the form of a segment running in the peripheral direction and extending over the periphery.

5. The container assembly of claim 2, and including, at the inner periphery of the second wall, a projection the form of a segment running in the peripheral direction and extending over the periphery.

6. The container assembly of claim 1, wherein the wraparound element on its outer periphery has a groove running in the peripheral direction and extending around the periphery.

7. The container assembly of claim 6, and including, at the inner periphery of the second wall, a projection the form of a segment running in the peripheral direction and extending over the periphery.

8. The container assembly of claim 1, and including, at the inner periphery of the second wall, a projection the form of a segment running in the peripheral direction and extending over the periphery.

* * * * *